(12) United States Patent
Hammonds

(10) Patent No.: US 7,934,572 B2
(45) Date of Patent: May 3, 2011

(54) PEOPLE MOVING VEHICLE WITH REDUCED TURN RADIUS HAVING OMNI-DIRECTIONAL CAB

(75) Inventor: Carl L. Hammonds, Humble, TX (US)

(73) Assignee: Hammonds Technical Services, Inc., Houston, TX (US)

( * ) Notice: Subject to any disclaimer, the term of this patent is extended or adjusted under 35 U.S.C. 154(b) by 0 days.

(21) Appl. No.: 12/712,350

(22) Filed: Feb. 25, 2010

(65) Prior Publication Data

US 2010/0155154 A1    Jun. 24, 2010

Related U.S. Application Data

(63) Continuation of application No. 11/362,953, filed on Feb. 27, 2006, now Pat. No. 7,694,758.

(51) Int. Cl.
*B62D 11/04*    (2006.01)

(52) U.S. Cl. ..................................... 180/6.64; 180/6.48

(58) Field of Classification Search ................. 180/6.64, 180/6.48, 6.5; 296/181.1, 64
See application file for complete search history.

(56) References Cited

U.S. PATENT DOCUMENTS

| 184,098 | A | 11/1876 | Mills |
| 655,329 | A | 8/1900 | Dougine |
| 813,213 | A | 2/1906 | Johnson |
| 4,221,273 | A | 9/1980 | Finder |
| 6,581,703 | B2 | 6/2003 | Hammonds |
| 6,860,345 | B2 | 3/2005 | Hammonds |
| 7,040,425 | B2 | 5/2006 | Hammonds |
| 2004/0079560 | A1 | 4/2004 | Hammonds |
| 2007/0017712 | A1 | 1/2007 | Dunn |

FOREIGN PATENT DOCUMENTS

JP    62283072 A    12/1987

OTHER PUBLICATIONS

Translation of JP 62-283072.

*Primary Examiner* — Kevin Hurley
(74) *Attorney, Agent, or Firm* — James E. Hudson, III; Crain, Caton & James, P.C.

(57) ABSTRACT

A vehicle with a omni-directional cab having a circular frame revolvably coupled to a chassis having an axle, wheels and passenger seats. Two independent drive wheels located on an axis through the center of the cab are mounted at the same distance from a central vertical axis through the cab. Each wheel is powered independently and can rotate at variable speeds in either direction. The cab is capable of movement in any direction by rotating the axis of the drive wheels to a position which is perpendicular to the desired direction of travel. The cab can spin about its vertical axis such that the axis of the drive wheels can be oriented at any direction without changing the original footprint of the space that the frame occupies over the ground. Thus, the combined cab/chassis assembly can rotate about the vertical midpoint of the chassis axle.

9 Claims, 7 Drawing Sheets

PEOPLE MOVING VEHICLE WITH REDUCED TURN RADIUS HAVING OMNI-DIRECTIONAL CAB

CROSS-REFERENCE TO RELATED APPLICATION

This application is a continuation of U.S. patent application Ser. No. 11/362,953 filed on Feb. 27, 2006 now U.S. Pat. No. 7,694,758, the priority of which is claimed.

BACKGROUND OF THE INVENTION

1. Field of the Invention

This invention relates generally to a wheeled vehicle designed to turn about a central vertical axis. In particular, the invention relates to powered utility riding vehicles of the type useful for moving persons and their belongings within an airport terminal, amusement park, zoo, malls, parking lots and other crowded locations where rotation-in-place steering is advantageous.

2. Description of the Prior Art

Within the transportation and entertainment industries, people moving carts are often routed through crowded and busy terminals, yards or parking lots. Space is normally at a premium, resulting in limited maneuvering space. Conventional people movers typically resemble long, wide golf carts with several back seats. They are configured with two axles, one in front, the other in the rear. The rear axle is fixed to the frame of the vehicle and provides motive force via a pair of dual wheels. The front axle provides for vehicle steering via two steerable wheels which simultaneously pivot with a limited angular range.

Because there is a fixed distance between the fixed rear drive axle and the front steerable axle, a turning radius exists that far exceeds the space actually occupied by the vehicle itself. The longer the distance between front and rear axles, the larger the turning radius that is required to change directions of the vehicle. A large turning radius makes maneuvering around tight areas difficult and often dangerous. In an area where movement is constrained, a people mover with a small turn radius is advantageous.

For example, in an airport terminal, a people mover operator must often move in reverse to maneuver in tight spaces. Operators are required to look over their shoulders in order to back up. In a congested location, hazards from reversing are increased. It is often difficult, even for a skilled operator, to perform a three-point U-turn in a narrow and crowded terminal; it may be necessary to jockey back and forth many times in order to complete a U-turn.

In an airport where people are routinely moved about, any increase in maneuvering efficiency and safety amounts to significant cost savings. It is desirable, therefore, to have a vehicle with greater maneuverability to enhance the safety of the operator, the passengers and the surrounding pedestrians.

Vehicles which have increased maneuverability are known in the art. For example, an omni-directional vehicle arranged for moving people through airports is disclosed U.S. Pat. No. 6,581,703, issued to Hammonds (Jun. 24, 2003), illustrated herein as FIGS. 1-2. The Hammonds circular omni-directional people mover has two drive wheels (212) capable of independent powered forward and reverse rotation disposed along a common horizontal axis (218), which provides a zero turn radius about center vertical axis (216) for unsurpassed maneuverability. A circumferential bench seat (272) provides for carrying passengers. As shown in FIG. 3, the Hammonds omni-directional vehicle may also be used to tow a number of trailers equipped for carrying luggage. An omni-directional tractor (310) with drive wheels (312) is removably coupled to a first trailer (311) using a trolley hitch (302) that freely slides along an outer circular rail (338) of the tractor. Each trailer also includes an outer circular rail and trolley hitch for towing a subsequent trailer. However, a "train" of carts as illustrated in FIG. 3 may not be ideal for use within crowded airport terminals for moving persons between gates. In some situations, a more traditionally shaped vehicle may be preferable to these vehicles.

3. Identification of Features Provided by Some Embodiments of the Invention

A primary object of the invention is to provide a service vehicle for transporting people which is designed and arranged for enhanced maneuverability.

Another object of the invention is to provide a service vehicle for transporting people that can turn on the spot and be of the smallest physical size relative to the space it occupies.

Another object of the invention is to provide a service vehicle for transporting people which reduces the risk of accidents which may result in damage or injury to pedestrians, passengers or operating personnel.

Another object of the invention is to provide a vehicle for moving people from one location to another location which obviates the need for the operator to drive in a reverse direction.

SUMMARY OF THE INVENTION

In one embodiment, the objects identified above along with other features and advantages of the invention are incorporated in an omni-directional vehicle cab rotatably and non-removably coupled to a chassis arranged to carry passengers. The omni-directional vehicle (ODV) cab provides unique maneuverability and efficiency due to a combination of its characteristics including its shape and the configuration of its drive wheels. When the ODV cab is combined with a radially movable passenger chassis to its circular frame, the combination provides increased maneuverability and safety of operation compared to traditional people-moving vehicles.

The ODV cab preferably includes a frame with a perfectly round outer perimeter, defined by a constant radius about a central vertical axis of the ODV cab. The ODV cab has two independent drive wheels located on a horizontal axis which intersects the vertical axis. Each wheel is at exactly the same distance from the vertical axis, with each wheel having the capability to move independently and at infinitely variable speeds in forward and reverse directions. Thus, the ODV can move in any direction by rotating the axis of the drive wheels perpendicularly to the desired direction of travel. By applying motive force to the wheels in the appropriate direction and speed, the ODV cab can turn and move in any direction perpendicular to the axis of the drive wheels. The ODV cab can also rotate about the vertical axis to any radial heading without changing its original footprint. Accordingly, the ODV cab requires a true zero turning or maneuvering radius, and thus requires only the space that it occupies in which to maneuver in any direction.

The ODV cab is revolvably coupled to a passenger chassis, preferably using a circumferential hitch assembly. The hitch assembly includes a circular bearing race, with smooth unobstructed inner, upper, and lower surfaces. The bearing race is rigidly attached at its outer surface to the passenger chassis. The ODV cab includes a plurality of rollers that are rotatably coupled to the bearing race so that the chassis can move freely around the entire circumference of the outer ring of the ODV. The chassis, rotatably coupled to the ODV, includes a fixed rear axle with preferably two wheels that contact the ground to support the weight of the chassis and its passengers. A number of seats are mounted to the chassis for comfortably carrying passengers.

When the attached passenger chassis needs to be backed, the operator of the vehicle rotates the ODV to face the chassis and then pushes the chassis backward. The motion is similar to backing up a conventional vehicle except that the operator faces in the direction of motion. For normal forward motion, the ODV vehicle rotates to face in the desired direction of travel and the passenger chassis is pulled in a conventional fashion. The chassis wheels provide stability for the ODV when positioned at any heading.

The ODV cab can move omni-directionally about a given point, change directions with zero maneuvering room beyond the physical footprint of the vehicle, and push or pull the passenger chassis with precise control. These capabilities reduce the operating space on the ground required to maneuver, thus increasing operating efficiency. Safety is enhanced, because the operator of the vehicle, positioned directly at the center of the ODV cab, can always be facing the direction at which the vehicle is moving, never having to back up and look backward.

BRIEF DESCRIPTION OF THE DRAWINGS

The invention is described below with reference to preferred embodiments which are illustrated by the attached drawings, of which.

DESCRIPTION OF THE PREFERRED EMBODIMENT OF THE INVENTION

Figure 2:
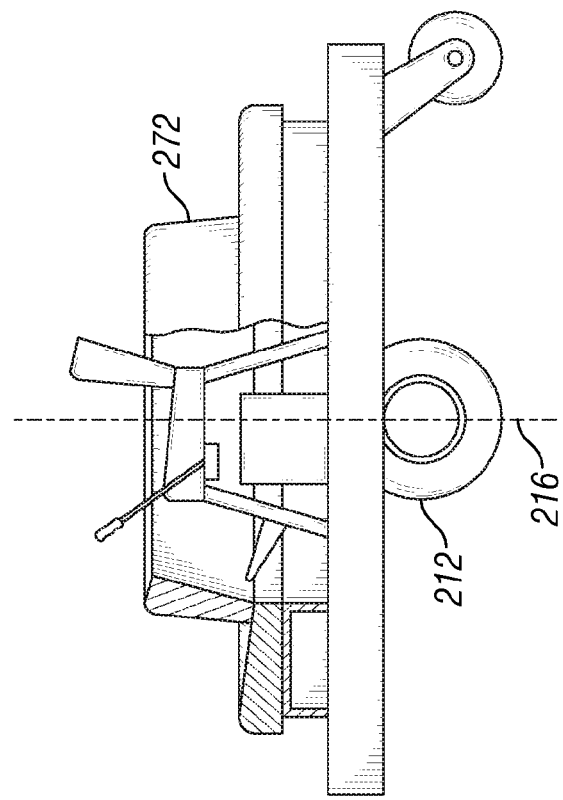
FIG. 2 is a side view of the omni-directional people moving vehicle of FIG. 1.
Figure 1:
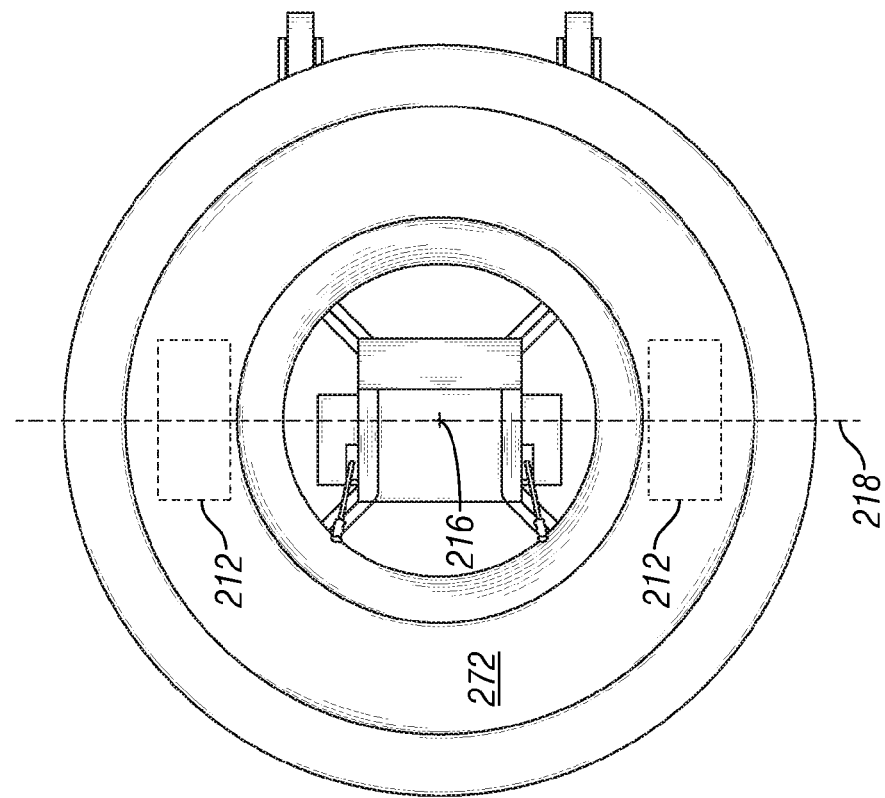
FIG. 1 is a plan view of a prior art omni-directional vehicle with a circular bench seat for moving people.
Figure 3:
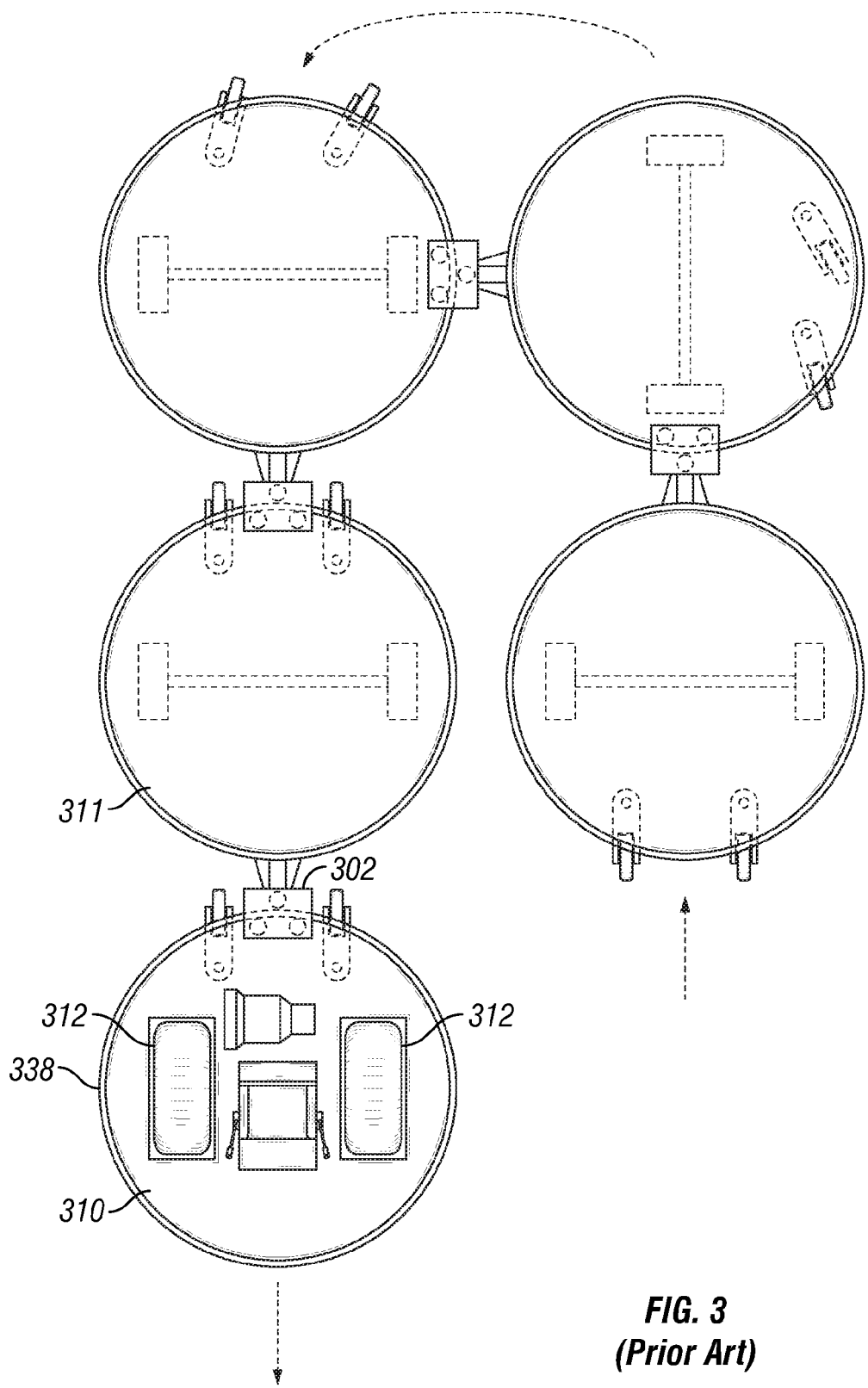
FIG. 3 is a plan view of a prior art omni-directional tractor vehicle with a freely traveling trolley hitch on a circular rail towing a number of trailers, each with a similar circular rail and trolley hitch to form a train of linked, highly maneuverable vehicles for carrying luggage around an airport.
Figure 4:
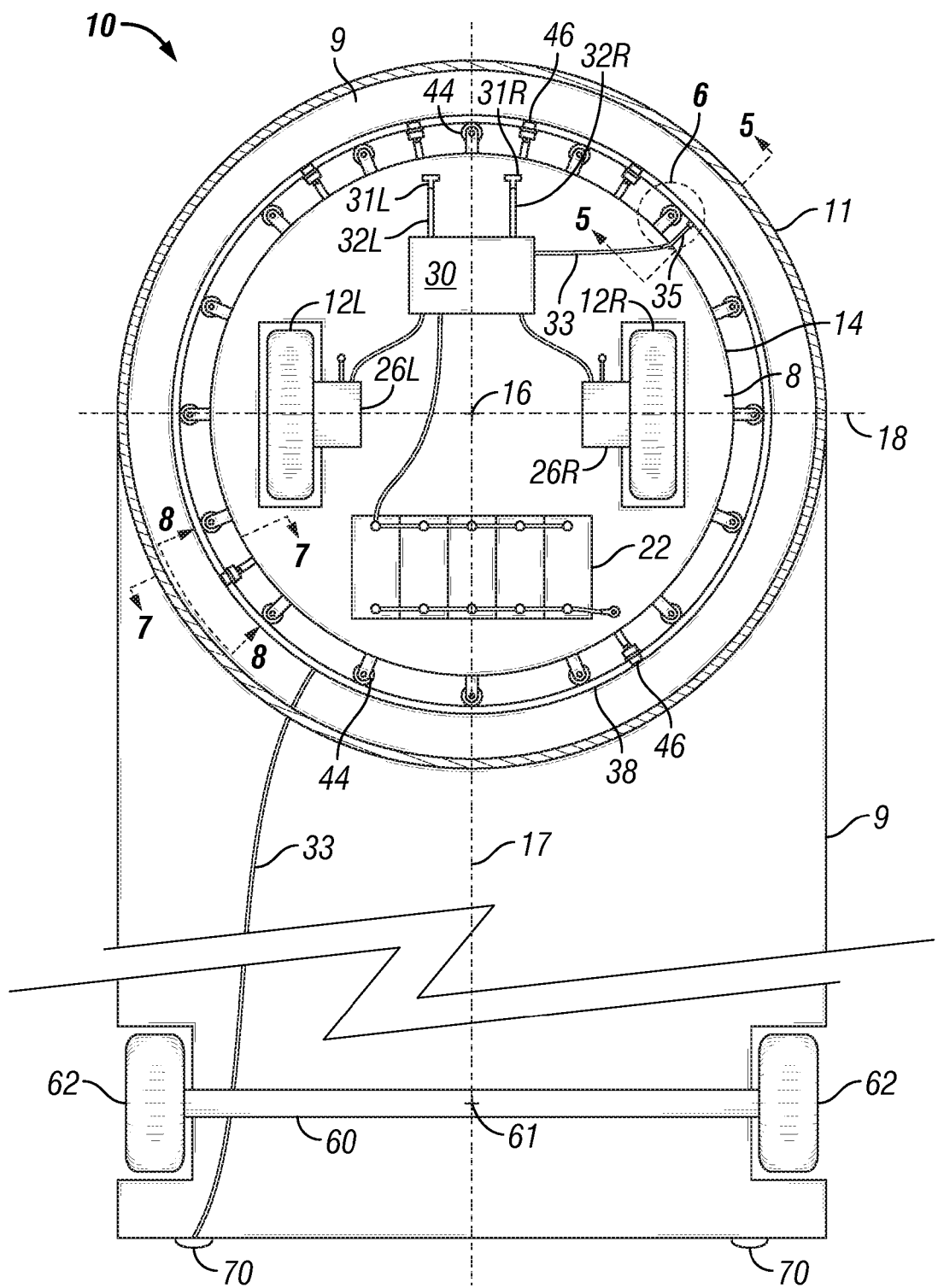
FIG. 4 is a top view cross section of a unitary vehicle according to one embodiment of the invention taken along lines 4-4 of FIG. 9 to show the major components a passenger chassis with a circular bearing race and an ODV cab with a number of rollers engaging the bearing race for rotatably connecting the passenger chassis to the ODV cab.

As shown in FIG. 4, the unitary passenger vehicle 10 according to one embodiment of the invention includes an omni-directional vehicle (ODV) cab 8 rotatably coupled to a passenger chassis 9. The ODV cab is preferably permanently and non-removably coupled to the chassis, i.e., the cab and chassis are designed to remain coupled for all but repair, service or maintenance periods. ODVs are known in prior art from U.S. Pat. No. 6,581,703, issued to Hammonds (Jun. 24, 2003), which is incorporated herein in its entirety by reference. The ODV 8 includes two primary drive wheels 12L, 12R mounted on a frame 14 which preferably has an outer perimeter in the shape of a circle. The circular frame preferably has a central vertical axis 16 which is perpendicular to the plane of the top view of FIG. 4. The wheels 12L, 12R are mounted along a horizontal axis 18 which intersects the vertical axis 16 as shown in FIG. 4.

A passenger chassis 9 is revolvably and permanently (i.e., other than for maintenance, service and repair) coupled to ODV cab 8. Chassis 9 preferably includes a rear axle 60 with one or more wheels 62. Rear wheels 62 are designed and arranged to freewheel, but they may be equipped with brakes for increased safety.

A power source 22 mounted on the frame 14 is provided for driving the vehicle. The power source 22 is preferably a battery or an internal combustion engine with a generator. The power source 22 preferably provides electrical power to separate electric motors 26L, 26R, one for each wheel 12L, 12R. However, power source 22 may alternatively drive a hydraulic pump that powers individual hydraulic motors to turn drive wheels 12R, 12L, or it may power drive wheels 12L, 12R by independent mechanical transmissions (not shown). The speed and direction of rotation of motors 26L, 26R and wheels 12L, 12R are controlled by control system 30 which receives control input from the operator through the positioning of control levers 31L, 31R (best seen in FIGS. 9-14). Control levers 31L, 31R are operatively coupled to control system 30 by mechanical linkages 32L, 32R or by an electrical control system (not shown).

The control levers 31L, 31R and motors 26L, 26R operate exactly the same for each of the left and right wheels 12L, 12R, respectively. Each lever 31L, 31R has a central neutral position, such that when a lever is at the neutral position, a wheel associated with that lever is preferably freewheeled or braked. If a lever 31L, 31R is moved forward, the corresponding wheel motor 26L, 26R rotates in a forward direction for turning a respective wheel 12L, 12R. If a lever 31L, 31R is moved backward, the corresponding wheel motor 26L, 26R rotates in a backward direction for turning a respective wheel 12L, 12R. The greater distance that a lever 31L, 31R is pushed or pulled from its neutral position, the faster the corresponding wheel motor 26L, 26R turns, thereby causing the connected wheel 12L, 12R to increase in speed.

If both levers 31L, 31R are moved in the same direction and amount at the same time, both drive wheels 12L, 12R move at the same speed, thereby causing straight-ahead movement of the ODV cab 8 over the ground, perpendicular to the horizontal axis 18. If the levers 31L 31R are pushed forward or backward at an unequal distance from each other, the lever moved the greater distance will produce a greater speed of rotation at its corresponding wheel causing the vehicle to turn toward the wheel that is turning slower. For example, if the right control lever 31R is pushed farther forward than is the left lever 31L, the ODV cab 8 turns to the left, and vice versa.

If the right lever 31R is moved forward and the left lever 31L is moved backward and both lever positions are the same in amount and opposite in direction, the left wheel 12L turns backward and the right wheel 12R turns forward, both at the same rate of rotation. In this instance, the ODV cab 8 turns in its own space or footprint while its footprint remains stationary over ground, i.e., the ODV cab revolves about the vertical axis 16. (The ODV footprint is the area of the ground beneath the ODV's circular perimeter.) The counter-clockwise rotation described above becomes a clockwise rotation when the right wheel 12R rotates backward at the same rate as the forward rotation of the left wheel 12L. Thus, the ODV cab 8 can change its heading while not moving or varying its footprint over the ground during such a change of heading.

Figure 7:
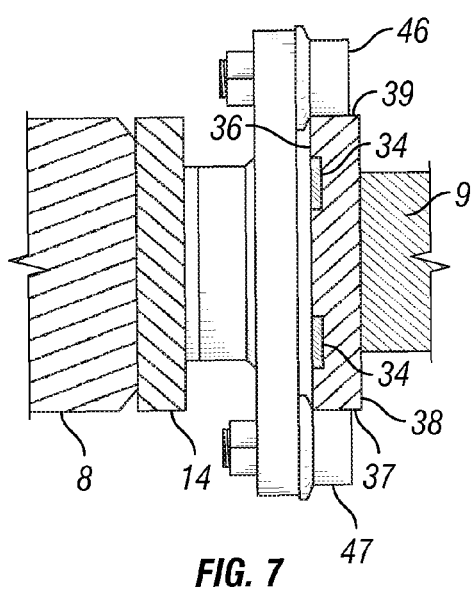
FIG. 7 is an enlarged side view cross section taken along lines 7-7 of FIG. 4 illustrating details of horizontally-oriented coupling rollers and a circular bearing race for vertically revolvably coupling the passenger chassis to the ODV cab.
Figure 8:
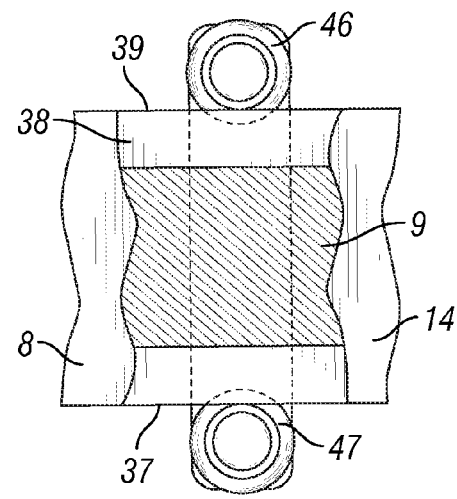
FIG. 8 is an enlarged front view cross section taken along lines 8-8 of FIG. 4 illustrating details of horizontally-oriented coupling rollers and a circular bearing race for vertically revolvably coupling the passenger chassis to the ODV cab.

Referring to FIG. 4, passenger chassis 9 is revolvably and circumferentially coupled to ODV cab 8. A circular bearing race 38 is mounted to passenger chassis 9 by suitable means, such as by welding or bolting. The bearing race 38 provides smooth surfaces for receiving and revolvably coupling ODV cab 8, which preferably has a plurality of vertical and horizontal rollers 44, 46, 47 (FIGS. 7-8) that engage and rotatably capture bearing race 38 in both vertical and horizontal directions with substantially no looseness for revolvably coupling ODV cab 8 to passenger chassis 9. The mounting positions of the rollers generally match the curvature of the bearing race 38, thus allowing the ODV cab 8 to rotate smoothly with minimal friction and resistance about the chassis 9. The number, size, and placement of the rollers may vary depending on the design loads. The rollers may be equipped with ball bearings to provide smooth rotation under load. Alternatively, other coupling arrangements may be used to revolvably couple chassis 9 to cab 8.

FIGS. 5-8 illustrate the cab/chassis interface details according to one embodiment. Referring to FIGS. 4-8, the bearing race 38 is mounted to the passenger chassis 9 by a suitable means, such as by bolting or welding. ODV cab 8 has a plurality of vertically-oriented rollers 44 disposed between the inner surface 36 of bearing race 38 and the circular perimeter of ODV frame 14. Vertically-oriented rollers 44 engage the inner surface 36 of the bearing race 38 to horizontally couple ODV cab 8 to passenger chassis 9. ODV cab 8 also has a plurality of horizontally-oriented rollers 46 located to engage the top surface 39 of the bearing race 38, and a plurality of horizontally-oriented rollers 47 located to engage the bottom surface 37 of the bearing race 38. The horizontally-oriented rollers 47 ride along the bottom surface 37 of the bearing race to vertically support chassis 9 on ODV cab 8, and the horizontally-oriented rollers 46 ride along the top surface 39 of the bearing race 38 to prevent the lower surface 37 of the bearing race 38 from becoming disengaged from the lower horizontal rollers 47. The vertical and horizontal rollers 44, 46, 47 cooperate to horizontally and vertically rotatably capture bearing race 38 with substantially no looseness for revolvably coupling passenger chassis 9 to ODV cab 8. In other words, the passenger chassis 9 is arranged and designed to freely and smoothly rotate within bearing race 38.

Figure 5:
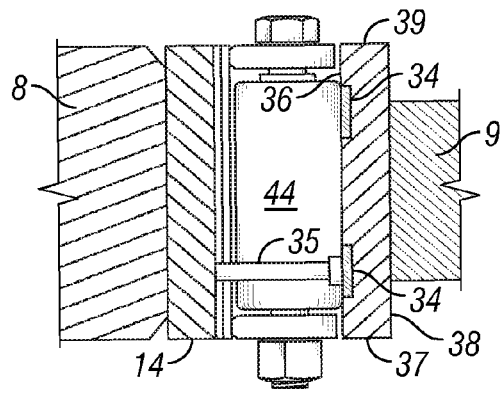
FIG. 5 is an enlarged side view cross section taken along lines 5-5 of FIG. 4 illustrating details of vertically-oriented coupling rollers and a circular bearing race for horizontally revolvably coupling the passenger chassis to the ODV cab.
Figure 6:
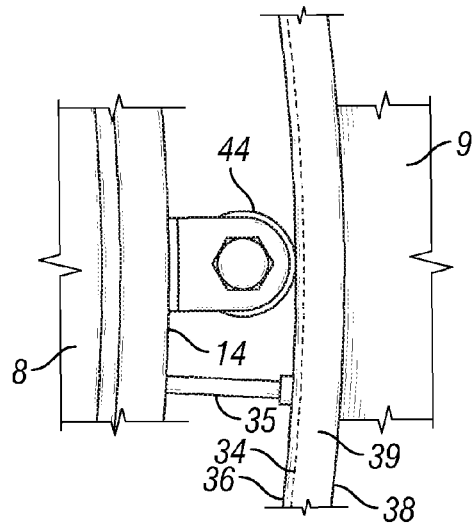
FIG. 6 is an enlarged top view of the vertically-oriented coupling rollers and circular bearing race of FIG. 5.

Referring to FIGS. 4-6, the passenger chassis 9 may require electrical power and control from the ODV cab 8. For instance, the passenger chassis 9 may require courtesy lights, brake lights and/or turn signals 70, particularly if the passenger vehicle will be subjected to use in public roadways. Preferably, electric power and control lines 33 are provided from the ODV cab 8 to the passenger chassis 9 via one or more slip rings 34 mounted on bearing race 38 and carbon brush assemblies 35 mounted to ODV frame 14 that maintain electrical continuity with the slip rings 34 during rotation. Alternatively, electric power and/or control may be provided from the ODV cab 8 to the chassis 9 via long extensible and resilient coiled cables (not illustrated) or via a swivel fitting (not illustrated) located at vertical axis 16. Using cables to bridge the cab/chassis interface provides for a simple design, but limits the number of revolutions the ODV cab 8 can turn in a single direction with respect to the chassis 9 without the need for unwinding by rotating in the opposite direction. As the design and arrangement of power transmission and control across movable boundaries is well known in the art, no further discussion is provided herein.

Referring to FIG. 4, the revolvable hitch assembly, including rollers 44, 46, 47 and bearing race 38, is completely circumferential, which helps to evenly distribute loads. However, partial circumferential arrangements may also be employed. A shroud 11 preferably covers the coupling components (including rollers 44, 46, 47 and bearing race 38), the drive components (including power source 22, motors 26L, 26R, and wheels 12L, 12R), and the ODV frame 14. Shroud 11 is coupled to frame 14 (not shown) and provides a mounting deck for operator seat 50 (FIG. 9).

Figure 9:
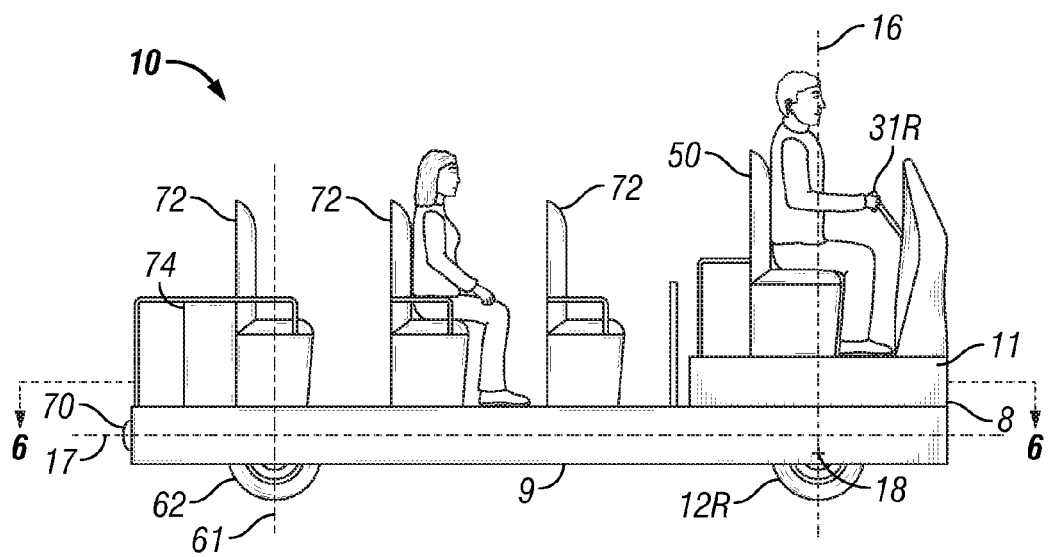
FIG. 9 is a side view of the passenger vehicle according to one embodiment of the invention with the ODV cab facing forward for normal operation of the vehicle.
Figure 10:
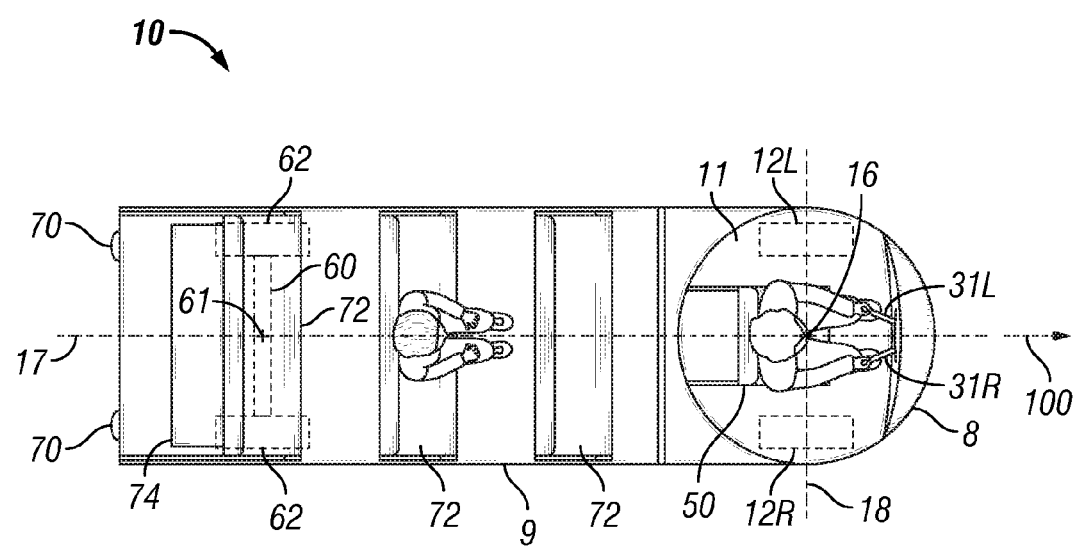
FIG. 10 is top view of the passenger vehicle of FIG. 9.

FIGS. 9 and 10 illustrate the passenger vehicle 10 according to one embodiment of the invention with the ODV cab 8 oriented with respect to the chassis 9 for ordinary forward motion, as shown by the arrow 100 in FIG. 10. ODV horizontal axis 18 is oriented perpendicularly to the chassis longitudinal axis 17. A seat 50 for the operator is mounted to shroud 11 with the vertical axis 16 passing through it. Chassis 9 is ideally equipped with a number of seats 72 for carrying passengers. A baggage storage bin 74 is also provided.

Figure 11:
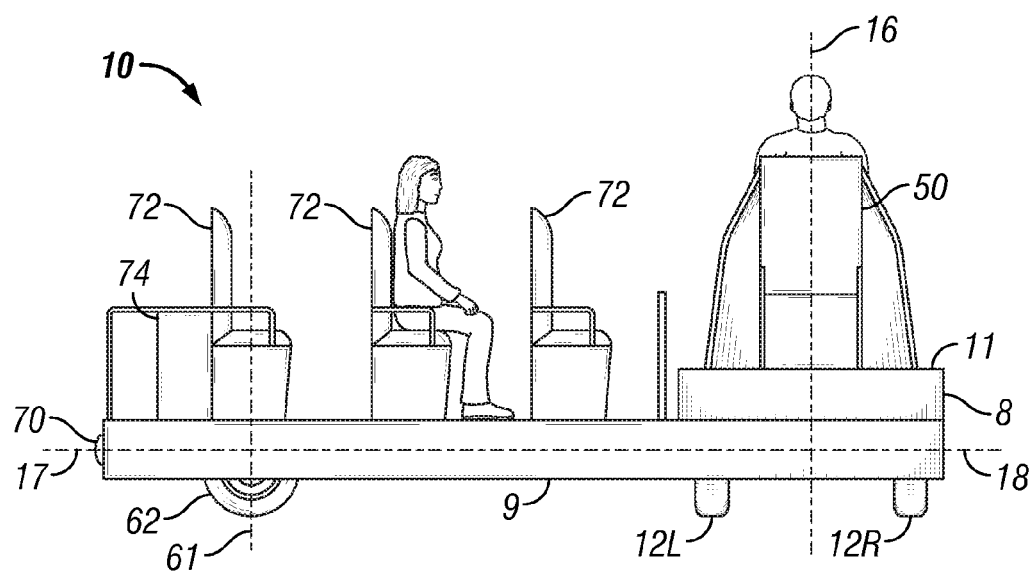
FIG. 11 is a side view of the passenger vehicle of FIG. 9 with the ODV cab oriented perpendicularly to the longitudinal axis of the vehicle for rotating the vehicle about the midpoint of the passenger chassis axle.
Figure 12:
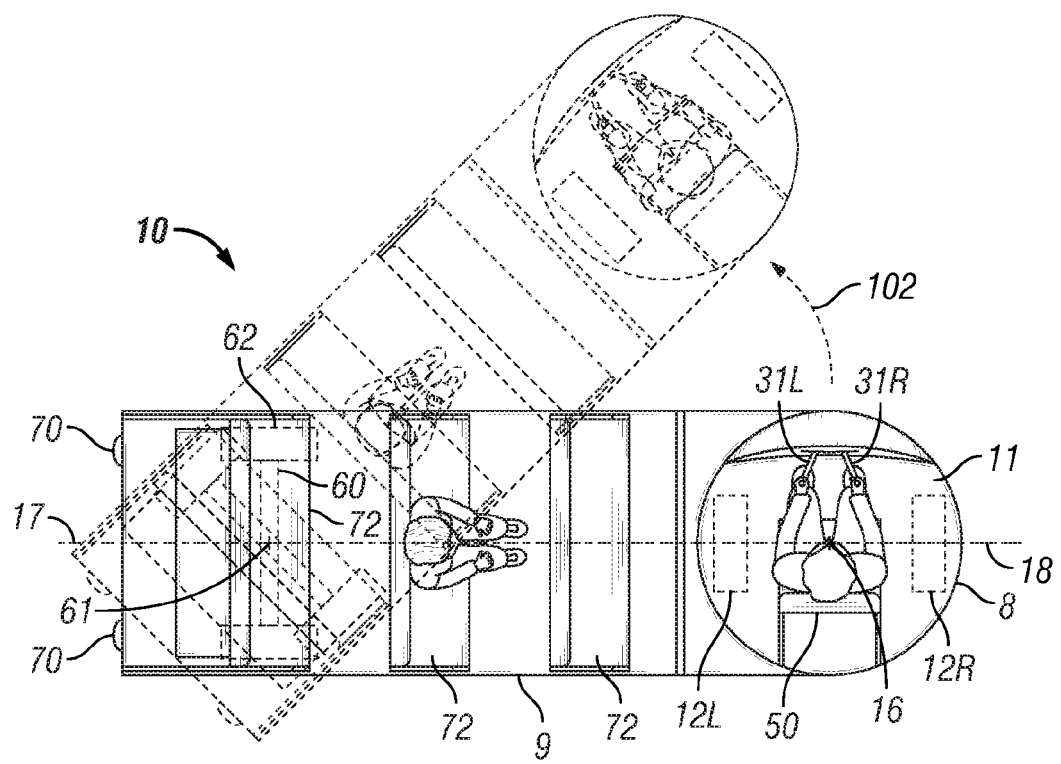
FIG. 12 is a top view of the passenger vehicle of FIG. 11, with the passenger vehicle rotated about the wheels of the passenger chassis.

FIGS. 11 and 12 show the passenger vehicle 10 oriented with ODV horizontal axis 18 aligned with the longitudinal center line 17 of the passenger chassis 9. The driver of the vehicle of FIGS. 9 and 10 needs only to push the right lever 31R forward while simultaneously pulling the left lever 31L backward an equal distance in order to rotate ODV cab 8 counterclockwise ninety degrees to arrive at the orientation shown in solid lines of FIGS. 11 and 12. During this operation, passenger chassis wheels 62 do not move. In the orientation shown in FIGS. 11 and 12, the passenger vehicle 10 has a zero turn radius about the vertical midpoint 61 of the rear axle 60. By pushing both right and left levers 31R, 31L forward, the right lever 31R slightly more forward than the left lever 31L, the passenger vehicle 10 can be made to pivot about the vertical midpoint 61 of the rear axle 60 for repositioning the vehicle, as illustrated by arrow 102 in FIG. 12 to reach the position shown in dotted lines.

Figure 13:
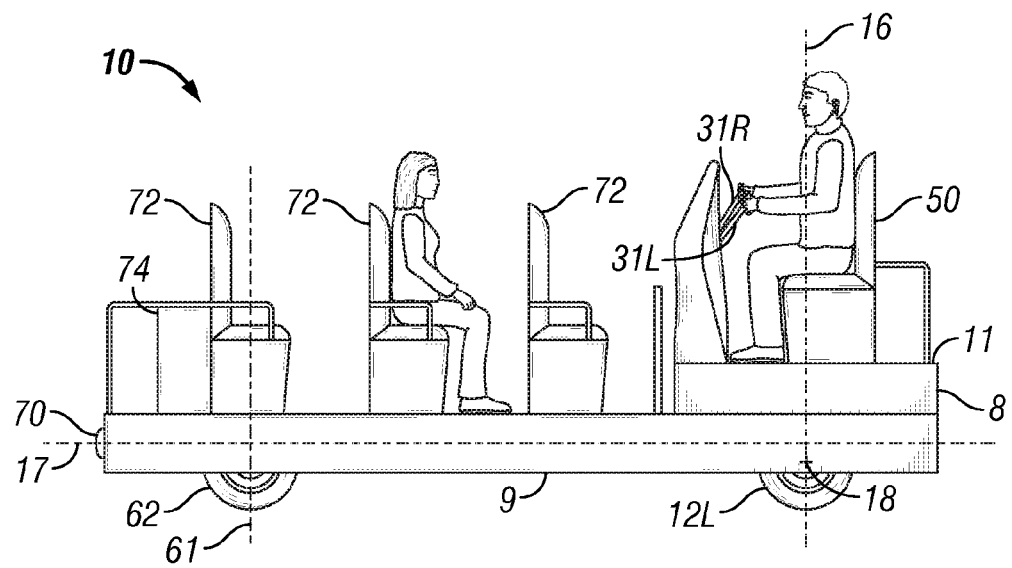
FIG. 13 is a side view of the passenger vehicle of FIG. 9 with the ODV cab oriented backward for backing the vehicle.
Figure 14:
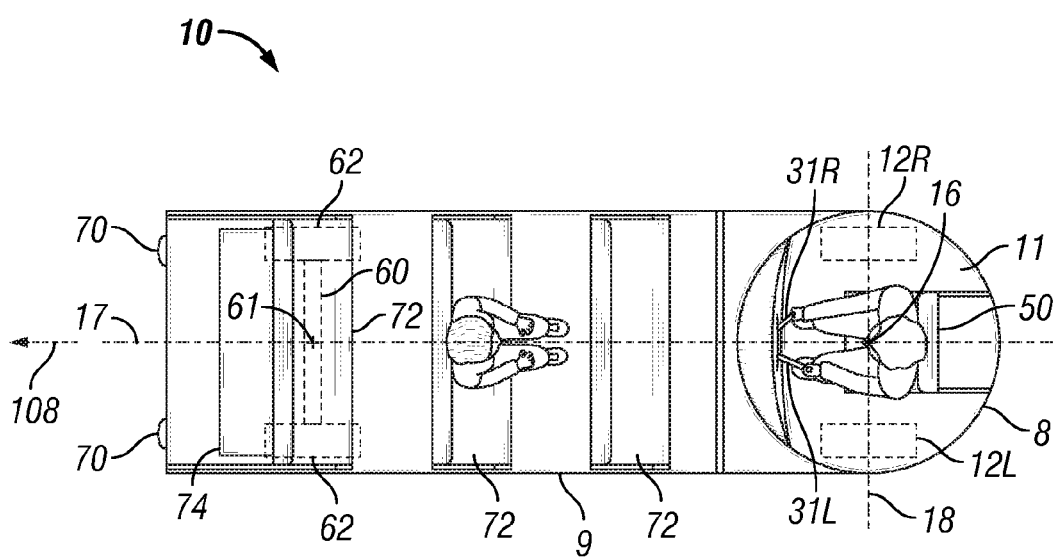
FIG. 14 is a top view of the passenger vehicle of FIG. 13.

In FIGS. 13 and 14, passenger vehicle 10 is positioned for reverse travel; ODV cab 8 faces rearwardly toward passenger chassis 9. The reversing motion, illustrated by arrow 108 in FIG. 14, is similar to backing up a conventional vehicle with a trailer, except that the operator faces in the direction of motion. The operator needs not look over his shoulder for reversing as required in conventional vehicles. Because operator seat 50 is positioned higher than passenger seats 72, the driver has a clear line of sight over the seated passengers in the direction of travel. This feature allows the operator to clearly see obstructions and pedestrians at the rear of vehicle 10 while reversing, thereby enhancing safety.

The Abstract of the Disclosure is written solely for providing the United States Patent and Trademark Office and the public at large with written text to determine quickly from a cursory inspection the nature and gist of the technical disclosure, and it represents solely a preferred embodiment and is not indicative of the nature of the invention as a whole.

While some embodiments of the invention have been illustrated in detail, the invention is not limited to the embodiments shown; modifications and adaptations of the above embodiment may occur to those skilled in the art. Such modifications and adaptations are in the spirit and scope of the invention as set forth herein:

What is claimed is:

1. A unitary vehicle (10) comprising:
   an omni-directional cab (8) characterized by first and second drive wheels (12R, 12L) disposed along a horizontal axis (18) and capable of independent powered rotation, said omni-directional cab capable of rotation about a central vertical axis (16); and
   a chassis (9) defining a chassis longitudinal axis (17) that intersects said vertical axis (16) and having an axle (60) mounted to said chassis (9) so as to remain perpendicular to said chassis longitudinal axis (17), said axle (60) rotatively carrying a first wheel (62), said chassis revolvably and non-removably coupled to said omni-directional cab.

2. The vehicle of claim 1 further comprising:
   a circular bearing race (38) coupled to said chassis (9) with said omni-directional cab revolvably captured within said circular bearing race.

3. The vehicle of claim 2 further comprising:
   a slip ring (34) mounted to said bearing race, and
   a brush assembly (35) coupled to said omni-directional cab (8) disposed to maintain electrical contact with said slip ring.

4. The vehicle of claim 1 further comprising:
   an operator seat (50) mounted on said cab at a position intersected by said vertical axis (16), said operator seat disposed at a height higher than said seat of said chassis.

5. The vehicle of claim 1 further comprising:
   a first control lever (31R) operatively coupled to a first motor (26R) for controlling the speed and direction of rotation of said first drive wheel (12R); and
   a second control lever (31L) operatively coupled to a second motor (26L) for controlling the speed and direction of rotation of said second drive wheel (12L).

6. The vehicle of claim 1 where said omni-directional cab (8) further comprises:
   a generally circular frame (14) centered about said vertical axis (16).

7. The vehicle of claim 6 wherein:
   said circular bearing race (38) is revolvably disposed about the outer perimeter of said frame.

8. The vehicle of claim 1 wherein:
   said axle (60) rotatively carries a second wheel (62), and
   said axle (60) defines a midpoint (61) that intersects said chassis longitudinal axis (17).

9. A unitary vehicle (10) comprising:
   an omni-directional cab (8) characterized by first and second drive wheels (12R, 12L) disposed along a horizontal axis (18) and capable of independent powered rotation, said omni-directional cab capable of rotation about a central vertical axis (16);
   a chassis (9) having an axle (60) with a wheel (62) rotatably attached thereto, said chassis revolvably and non-removably coupled to said omni-directional cab;
   a circular bearing race (38) coupled to said chassis (9) with said omni-directional cab revolvably captured within said circular bearing race;
   a slip ring (34) mounted to said bearing race; and
   a brush assembly (35) coupled to said omni-directional cab (8) disposed to maintain electrical contact with said slip ring.

\* \* \* \* \*